(12) United States Patent  
Kubo

(10) Patent No.: US 7,460,018 B2  
(45) Date of Patent: Dec. 2, 2008

(54) COMMUNICATIONS SYSTEM FOR AN RFID TAG HAVING AN INDUCTIVE ANTENNA DEVICE DETACHABLE OR MOVABLE

(75) Inventor: Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 290 days.

(21) Appl. No.: 11/525,891

(22) Filed: Sep. 25, 2006

(65) Prior Publication Data

US 2007/0069858 A1    Mar. 29, 2007

(30) Foreign Application Priority Data

Sep. 29, 2005    (JP)    ............... 2005-285160

(51) Int. Cl.  
*G08B 13/14*    (2006.01)

(52) U.S. Cl. .............. 340/572.7; 340/572.1; 340/572.8; 343/842

(58) Field of Classification Search .............. 340/572.1, 340/572.7, 572.8; 343/842  
See application file for complete search history.

(56) References Cited

U.S. PATENT DOCUMENTS

2006/0208899 A1* 9/2006 Suzuki et al. ............ 340/572.7

2007/0080810 A1* 4/2007 Juds ........................ 340/572.8

FOREIGN PATENT DOCUMENTS

GB    2360422 A  *  9/2001

OTHER PUBLICATIONS

Jun-ichi Kishigami, "All about Wireless IC Tags Directed to Ubiquitous Society - RFID Textbook" published by ASCII Corporation, Tokyo, Japan, pp. 165-184, 2005.

* cited by examiner

*Primary Examiner*—Jeff Hofsass  
*Assistant Examiner*—Kerri L Mcnally  
(74) *Attorney, Agent, or Firm*—Rabin & Berdo, PC

(57) ABSTRACT

An inductive antenna device intervenes in communication between an RFID tag including an RFID chip and a tag antenna and an RFID access device for accessing the RFID tag. The inductive antenna device includes an access-device-side antenna that is electromagnetically coupled with the antenna of the RFID access device, and a tag-side antenna that is electromagnetically coupled with the tag antenna. The RFID chip and tag antenna in the RFID tag are in an electromagnetically shielded space. The inductive antenna device is attached to the RFID tag or the inductive antenna device is brought in a predetermined position to make communication possible between the RFID tag and RFID access device. An authorized access to the RFID tag is thereby permitted with easy operation with unlimited number of access times, and an illegal leak of the tag information is prevented with a low cost configuration.

9 Claims, 5 Drawing Sheets

COMMUNICATIONS SYSTEM FOR AN RFID TAG HAVING AN INDUCTIVE ANTENNA DEVICE DETACHABLE OR MOVABLE

CROSS REFERENCE TO RELATED APPLICATIONS

This application claims priority to Application No. 2005-285160, filed on Sep. 29, 2005 in Japan.

BACKGROUND OF THE INVENTION

1. Field of the Invention

The present invention relates to an RFID (Radio Frequency IDentification) tag communications system including an RFID tag comprising an RFID chip and a tag antenna connected to the RFID chip.

2. Description of the Background Art

A system or a service using an RFID tag requires measures to protect itself against an illegal access of an unintended third person from reading or writing the tag information contained in the RFID tag or the like. Conventional RFID privacy protection technologies are described, for example, in Jun-ichi Kishigami, "All about Wireless IC Tags Directed to Ubiquitous Society—RFID Textbook" published by ASCII Corporation, Tokyo, Japan, pp. 165-184, 2005. This document describes three types of conventional RFID privacy protection technologies as briefly stated below.

One conventional RFID privacy protection technology is the Kill function. This technology disables an RFID tag to terminate its function once delivered to a consumer.

Another conventional RFID privacy protection technology is the internal re-encryption method. This technology makes an RFID tag equipped with the function of re-encrypting a public key cipher. An RFID tag is responsive to each delivery of a send request from an RFID reader to re-encrypt and send tag information such as tag identification (ID).

The remaining conventional RFID privacy protection technology is the Faraday cage. This technology prevents the illegal delivery of information such as tag identification from an RFID tag by covering the RFID tag with a material such as an aluminum foil that can shield radio waves.

The Kill function, however, suffers from problems in that the processing for disabling an RFID tag takes a long time, and the RFID tag, once disabled, cannot be used for services any more.

The internal re-encryption method needs to provide an RFID tag with means for encrypting tag information. The RFID tag then becomes more costly and the time per access becomes longer due to encryption or decryption.

For the Faraday cage, an RFID tag is required, every time to be accessed, to be taken out of and brought into its cover. This consumes time and cannot protect the RFID tag against an illegal access while it is out of the cover.

SUMMARY OF THE INVENTION

It is therefore an object of the present invention to provide an RFID tag communications system with its security function improved.

It is a more particular object of the invention to provide an RFID tag communications system that may permit a normal access to an RFID tag with an easier operation without limiting access times.

It is another object of the invention to provide an RFID tag communications system which may prevent its tag information from illegally leaking with an inexpensive configuration. An RFID tag and an inductive antenna device for use in such a system are also provided.

In accordance with the present invention, an RFID (Radio Frequency IDentification) tag comprises: an RFID chip; a tag antenna connected to the RFID chip; an electromagnetic shield for forming a space including the RFID chip and the tag antenna into an electromagnetically shielded space; and a positional-relationship controller for providing a first positional relationship and a second positional relationship as a relative positional relationship between an inductive antenna device and the RFID tag, the inductive antenna device including an access-device-side antenna capable of being electromagnetically coupled with an antenna of an RFID access device, a tag-side antenna capable of being electromagnetically coupled with the tag antenna and a conductive line for electrically connecting the access-device-side antenna with the tag-side antenna, the first positional relationship making possible electromagnetic coupling between the tag antenna and the tag-side antenna staying in the electromagnetically shielded space with the access-device-side antenna positioning outside the electromagnetically shielded space, the second positional relationship making impossible electromagnetic coupling between the tag antenna and the tag-side antenna.

The present invention also provides an RFID tag communications system comprising: an RFID tag including an RFID chip and a tag antenna connected to the RFID chip; an RFID access device for activating wireless communication for accessing the RFID tag; and an inductive antenna device including an access-device-side antenna capable of being electromagnetically coupled with an antenna of the RFID access device, a tag-side antenna capable of being electromagnetically coupled with the tag antenna, and a conductive line for electrically connecting the access-device-side antenna and the tag-side antenna, the RFID tag comprising: an electromagnetic shield for forming a space including the RFID chip and the tag antenna into an electromagnetically shielded space; and a positional-relationship controller for providing a first positional relationship and a second positional relationship as a relative positional relationship between the inductive antenna device and the RFID tag, the first positional relationship making possible electromagnetic coupling between the tag antenna and the tag-side antenna staying in the electromagnetically shielded space with the access-device-side antenna positioning outside the electromagnetically shielded space, the second positional relationship making impossible electromagnetic coupling between the tag antenna and the tag-side antenna.

The present invention also provides an inductive antenna device intervening in communication between an RFID tag including an RFID chip and a tag antenna connected to the RFID chip and an RFID access device for activating wireless communication for accessing the RFID tag, comprising: an access-device-side antenna capable of being electromagnetically coupled with an antenna of the RFID access device; a tag-side antenna capable of being electromagnetically coupled with the tag antenna; and a conductive line for electrically connecting the access-device-side antenna and the tag-side antenna, a first positional relationship and a second positional relationship being provided as a relative positional relationship of the inductive antenna device to the RFID tag, the first positional relationship making possible electromagnetic coupling between the tag antenna and the tag-side antenna staying in an electromagnetically shielded space provided in the RFID tag with the access-device-side antenna positioning outside the electromagnetically shielded space, the second positional relationship making impossible electromagnetic coupling between the tag antenna and the tag-side antenna.

In accordance with the present invention, the RFID tag has an RFID chip and a tag antenna built in an electromagnetically shielded space, and the RFID chip in the electromagnetically shielded space may be accessed using an inductive antenna device that is detachable from, or movable relative to, the RFID tag, thereby permitting an authorized access to the RFID tag with an easy operation with unlimited number of access times, and preventing an illegal leak of the tag information with a low cost configuration.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

With reference to the accompanying drawings, a description will be given below of an RFID (Radio Frequency IDentification) tag communications system in accordance with an illustrative embodiment of the present invention. The illustrative embodiment is directed to an RFID tag communications system applied to a sales management system of commercial products although the present invention is not limited thereto.

Figure 1:
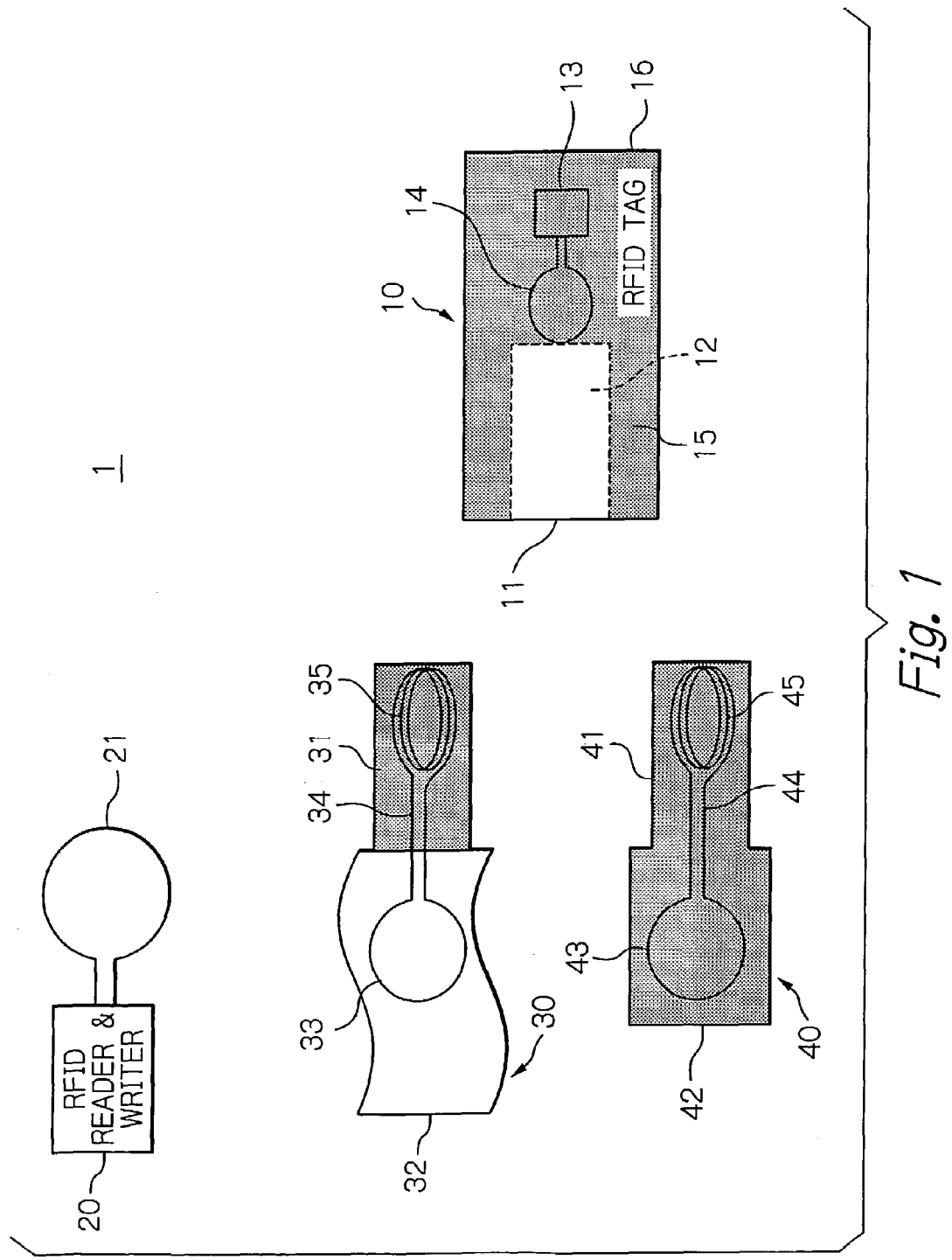
FIG. 1 illustrates the schematic configuration of the RFID tag communications system in accordance with an illustrative embodiment of the present invention.

With reference to FIG. 1, which illustrates the schematic configuration of the RFID tag communications system of the illustrative embodiment, the RFID tag communications system 1 mainly includes an RFID tag 10, an RFID reader and writer 20, a label inductive antenna device 30, and a management inductive antenna device 40.

The RFID tag 10 may be used when attached to a commercial product. The RFID tag 10 is, for example, of a card-like shape which is generally rectangular in its plan view. The RFID tag 10 has its one end, preferably its shorter end portion, an insertion slot 11 formed which may accept a mating card portion 31 or 41 of a label inductive antenna device 30 or management inductive antenna device 40, respectively, as will be described below. The mating card portions 31 and 41 are thinner than the RFID tag 10 in order to be received by the latter.

Figure 2:
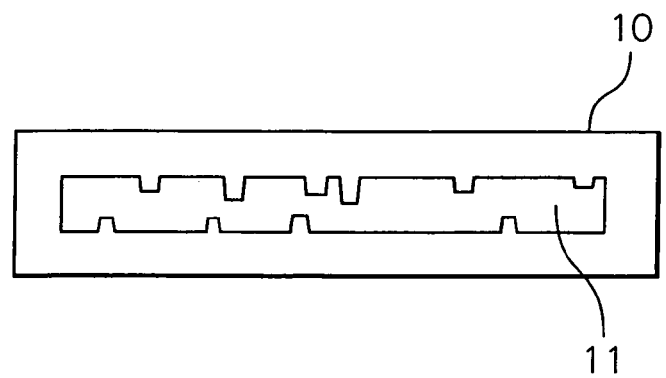
FIG. 2 is a front view of the insertion slot shape of the RFID tag of the illustrative embodiment shown in FIG. 1.

With reference to FIG. 2, for example, the insertion slot 11 has, like a keyhole for receiving a physical key, projections or depressions specific to the relevant RFID tag 10 in its cross section. Correspondingly, the mating card portions 31 and 41 of the label inductive antenna device 30 and management inductive antenna device 40, respectively, have projections or depressions formed in the cross-sectional outer shape or contour for mating with the relevant RFID tag 10. The mating card portion 41 of the management inductive antenna device 40 may has its cross-sectional outer shape formed so as to be received commonly by the insertion slot 11 of many RFID tags 10 like a master key.

Continuously following the above-described insertion slot 11, a receptacle space 12 to be mated is formed into the body of the RFID tag 10. The space 12 to be mated is adapted to receive the entire mating card portion 31 or 41 in its engageable condition. The RFID tag 10 includes therein an RFID chip 13 made of semiconductor and carrying an electronics device for storing tag information, and an antenna 14, referred to as a tag antenna, interconnected to the RFID chip 13, which are sealed with a sealant 15 such as resin.

The RFID tag 10 has its entire surface member 16 functioning as electromagnetically shielding the tag antenna 14 from communicating with outside. The electromagnetic shielding, which is depicted with shaded in the figures, may be achieved by, for example, metal plating, applying an electromagnetic shield seal or adhesive sheet, or fabricating at least one of the one or more layers, not limited to an exposed layer, which form the surface of the tag 10 with an electromagnetic shield material.

The tag antenna 14 is disposed in such a position in the RFID tag 10 that the tag antenna 14 establishes an electromagnetic coupling with a tag-side inductive antenna 35 or 45, described below, in the mating card portion 31 or 41, when inserted into the RFID tag 10, of the label inductive antenna device 30 or management inductive antenna device 40, respectively. FIG. 1 shows the tag antenna 14 as being in parallel with the tag-side inductive antenna 35 or 45 in the lateral direction in the figure. The position of the tag antenna 14 is, however, not limited to what is illustrated. Any position is applicable that establishes an electromagnetic coupling between the both antennas. The tag antenna 14 may be positioned so that, for example, the tag antenna 14 and tag-side inductive antenna 35 or 45 are overlapped with each other in the direction normal to the plane of FIG. 1.

The RFID tag reader and writer 20 has its function capable of transmitting and receiving, via its own antenna 21, an enquiry and a response electromagnetic wave or signal to and from the RFID tag 10 having its communication condition consistent with the reader and writer 20 to access the RFID tag 10. In the illustrative embodiment, the RFID tag reader and writer 20 accesses the RFID tag 10, more accurately the RFID chip 13, via the label inductive antenna device 30 or management inductive antenna device 40. The RFID tag reader and writer 20 sends, for example, the tag information read out from the RFID tag 10 to a higher-level device (for example, an information processing unit such as a personal computer) for commercial product management.

The label inductive antenna device 30 and management inductive antenna device 40 have the function of relaying the communication between the RFID tag 10 and RFID tag reader and writer 20. Either of the label inductive antenna device 30 and management inductive antenna device 40 may alternatively operate at one time.

The label inductive antenna device 30 is used, for example, before a commercial product to which the RFID tag 10 is attached is sold for the first time. The label inductive antenna device 30 includes the mating card portion 31 and a label portion 32. The mating card portion 31 may engage with the receptacle space 12 to be mated in the RFID tag 10, as described above. The label portion 32 is disposed outside the RFID tag 10 even when the mating card portion 31 is engaged with or inserted into the space 12 to be mated in the RFID tag 10. The label portion 32 maybe used as, for example, indicating various information, such as a trade name or price, on a commercial product or have an information seal attached thereto.

The label inductive antenna device 30 includes as components for the relay function, a reader and writer-side inductive antenna 33, an electrically conductive line 34, and the tag-side inductive antenna 35, which are interconnected as illustrated. The reader and writer-side inductive antenna 33 and tag-side inductive antenna 35 are both loop antennas. The reader and writer-side inductive antenna 33 and tag-side inductive antenna 35 are connected via the conductive line 34 to each other to form a loop current path in its entirety. The reader and writer-side inductive antenna 33 is provided in the label portion 32 so as to allow the antenna 33 to establish an electromagnetic coupling with its outside. When, for example, the label portion 32 is fabricated to have two flexible sheets laminated with each other, the antenna 33 intervenes between the two flexible sheets.

The tag-side inductive antenna 35 resides inside the mating card portion 31 in such a way that the antenna 35 may establish an electromagnetic coupling with its outside. When, for example, the mating card portion 31 is fabricated with resin, the resin seals the tag-side inductive antenna 35 there inside. The conductive line 34 electrically connects the reader and writer-side inductive antenna 33 to the tag-side inductive antenna 35, as described above. The conductive line 34 extends inside the label portion 32 and mating card portion 31.

The management inductive antenna device 40 may be used, for example, after a commercial product to which the RFID tag 10 is attached is sold for the first time. The management inductive antenna device 40 is almost the same in structure as the label inductive antenna device 30 except that a non-mating card portion 42 replaces the label portion 32 of the label inductive antenna device 30. The non-mating card portion 42 has a reader and writer-side inductive antenna 43 built therein. The non-mating card portion 42 is exposed outside even when the mating card portion 41 is engaged with the space 12 to be mated in the RFID tag 10. The non-mating card portion 42 may be formed with, for example, the same resin as used in the mating card portion 41.

The operation of the RFID tag communications system of the illustrative embodiment will be described below. The label inductive antenna device 30, when engaged with the RFID tag 10, is handled together before the RFID tag 10 is attached to a commercial product, or after the RFID tag 10 is attached to a commercial product before sold.

For example, once a manufacturer delivers the commercial product to a distributor, a person responsible attaches to the commercial product the RFID tag 10 having the label inductive antenna device 30 engaged.

The person responsible operates a higher-level device for commercial product management, not shown, to activate the RFID reader and writer 20. The RFID reader and writer 20 then reads the tag identification (ID) contained on the RFID chip 13 in the RFID tag 10, writes appropriate information on the RFID chip 13, and stores various information associated with the tag identification in a database for commercial product management in the relevant higher-level device, not specifically shown.

Figure 3:
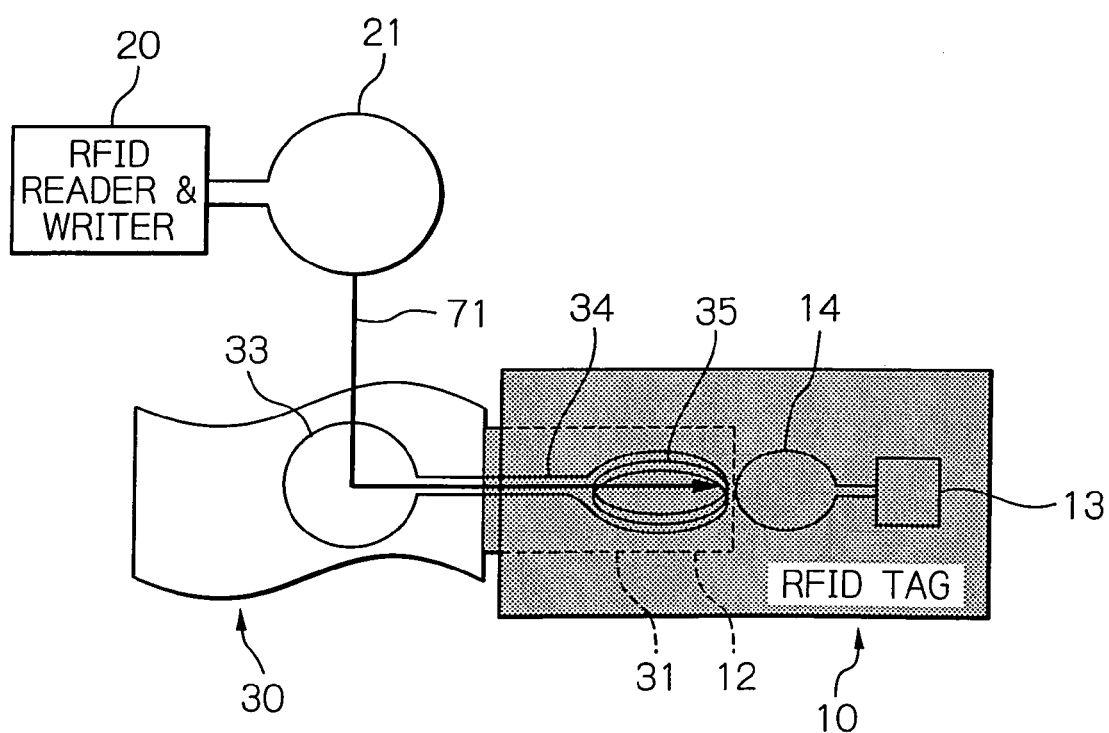
FIG. 3 illustrates a communication path, when the label inductive antenna device is used, in the RFID tag communications system of the illustrative embodiment.

As shown in FIG. 3, a communication path 71 will be exemplified when accessing to the RFID tag 10. The RFID reader and writer 20 emits an enquiry electromagnetic wave, such as a magnetic flux wave, from its antenna 21.

The enquiry electromagnetic wave cannot reach the tag antenna 14 residing in the electromagnetically shielded space nor the tag-side inductive antenna 35 that is made located in the electromagnetically shielded space by receiving the card portion 31 therein, but is captured by the reader and writer-side inductive antenna 33 outside the electromagnetically shielded space. The capture causes a current to be induced in the reader and writer-side inductive antenna 33. The current then flows on the loop current path formed by the reader and writer-side inductive antenna 33, conductive line 34, and tag-side inductive antenna 35. The current flowing through the tag-side inductive antenna 35 may cause a magnetic flux wave to emit which corresponds to the enquiry electromagnetic wave as described above. Because the tag-side inductive antenna 35 is also disposed inside the electromagnetically shielded space, the magnetic flux wave may reach the tag antenna 14, thereby establishing an electromagnetic coupling between the tag-side inductive antenna 35 and tag antenna 14.

When the enquiry electromagnetic wave instructs the reading of information from the RFID chip 13, the RFID chip 13 reads out the information and outputs it. When the enquiry electromagnetic wave instructs the writing of information into the RFID chip 13, the RFID chip 13 stores given information and produces a write response. The output from the RFID chip 13 changes the electromagnetic coupling state, or magnetic flux, between the tag-side inductive antenna 35 and tag antenna 14. The change is returned back on a response wave over the path in the reverse direction of the enquiry electromagnetic wave described above to the RFID reader and writer 20.

When changing, e.g. in position, a commercial product to which attached is the RFID tag 10 having the label inductive antenna device 30 engaged, an access from the RFID reader and writer 20 is used to update the database of the higher-level device or the like.

When a customer buys the commercial product and the sales procedure necessary for transaction is completed, the salesperson removes the label inductive antenna device 30 from the RFID tag 10 and passes to the customer the commercial product having the RFID tag 10 remaining alone. Alternatively, the salesperson passes to the customer the commercial product and the RFID tag 10 with the label inductive antenna device 30 removed therefrom.

The RFID reader and writer 20 cannot access the RFID tag 10 with the label inductive antenna device 30 removed therefrom because the electromagnetic shielding function prevents the enquiry electromagnetic wave from reaching the tag antenna 14. If a specific label inductive antenna device 30, which does not mate with the RFID tag 10, is tried to be inserted into the RFID tag 10, it would not be engaged with the RFID tag 10. A person who has a specific label inductive antenna device 30 not mating with the RFID tag 10 could not make the RFID tag 10 effectively accessible.

Suppose now, for example, that the RFID tag 10 is attached to a commercial product such as a brand-name article that may be frequently bought and sold even after used, and that the commercial product attached to the RFID tag 10 is brought in a right store dealing with used articles.

Figure 4:
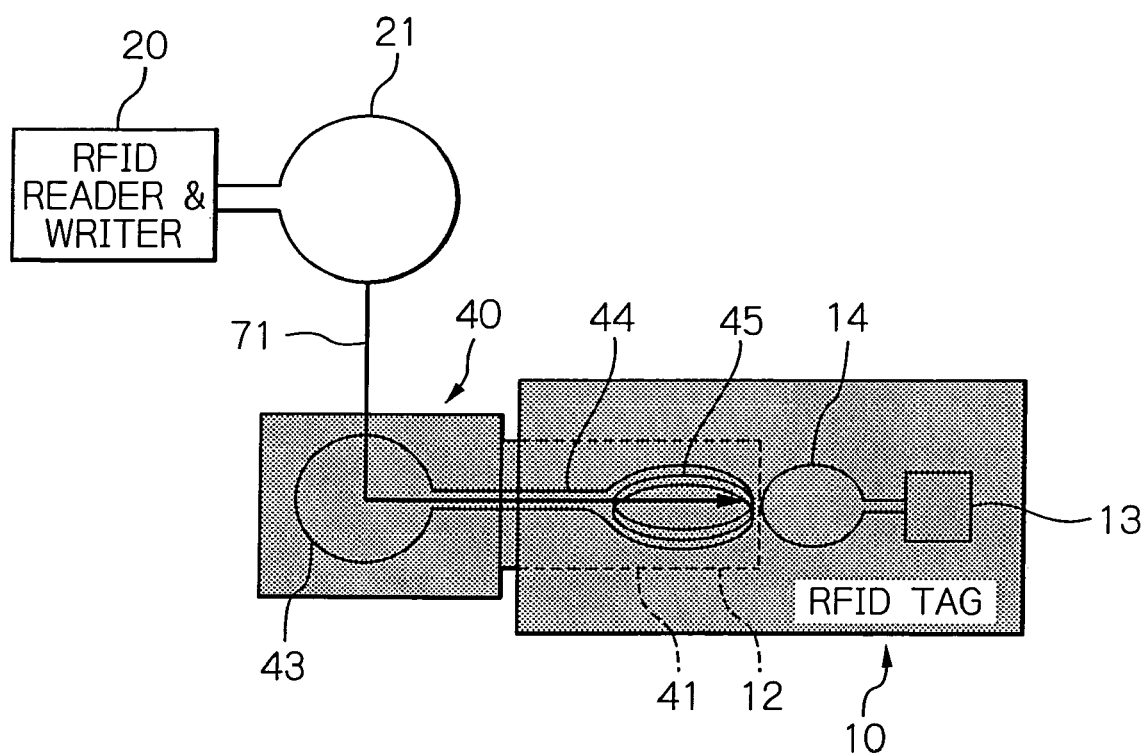
FIG. 4 illustrates the communication path, when the management inductive antenna device is used, in the RFID tag communications system of the illustrative embodiment.

In this case, the management inductive antenna device 40 is attached to the commercial product by engaging the card portion 41 with the RFID tag 10, and then the RFID reader and writer 20, which may differ from one used by the distributor, accesses the RFID tag 10. Also in this case, the RFID reader and writer 20 may access the RFID chip 13 on a communication path almost the same as the communication path 71 shown in FIG. 4 as in the label inductive antenna device 30 described above. For example, the RFID chip 13 including commercial product information or the like may determine whether or not the used product is the normal brand-name product.

As described above, according to the illustrative embodiment, the RFID reader and writer 20 that is not attached to the label inductive antenna device 30 or management inductive antenna device 40 may not access the RFID tag 10 due to the electromagnetic shielding function. The RFID tag 10 thus has higher security in tag information.

Also according to the illustrative embodiment, limited, specific label inductive antenna devices 30 can mate with the RFID tag 10. Specifically, label inductive antenna devices 30 not mating therewith may not be installed into the RFID tag 10. The RFID reader and writer 20 may access the RFID tag 10 only when the label inductive antenna device 30 normal or appropriate therefor is attached to the RFID tag 10. This also attains higher security in tag information of the RFID tag 10.

Further according to the illustrative embodiment, the security function described above may eliminate a troublesome procedure such as the disabling of the RFID tag 10 when a product carrying the tag is sold in order to prevent the tag information from being monitored.

Still further according to the illustrative embodiment, the transmitting and receiving processings themselves of the RFID tag 10 and RFID reader and writer 20 may not specifically be tailored with its security taken into account. The security function thus does not prolong the access time.

Even after the label inductive antenna device 30 mating with the RFID tag 10 is gone after the commercial product sold or the like, the management inductive antenna device 40 is available so that the tag information may be retrieved from the RFID tag 10 as necessary.

The coupling between the RFID tag 10 and label inductive antenna device 30 or management inductive antenna device 40 is attained electromagnetically and not mechanically. That permits resin or the like to hermetically seal the electronics components included in the RFID tag 10 and in the label inductive antenna device 30 or management inductive antenna device 40. Therefore, a water droplet, moisture or any other environmental factor does not deteriorate the electronics components.

Figure 5:
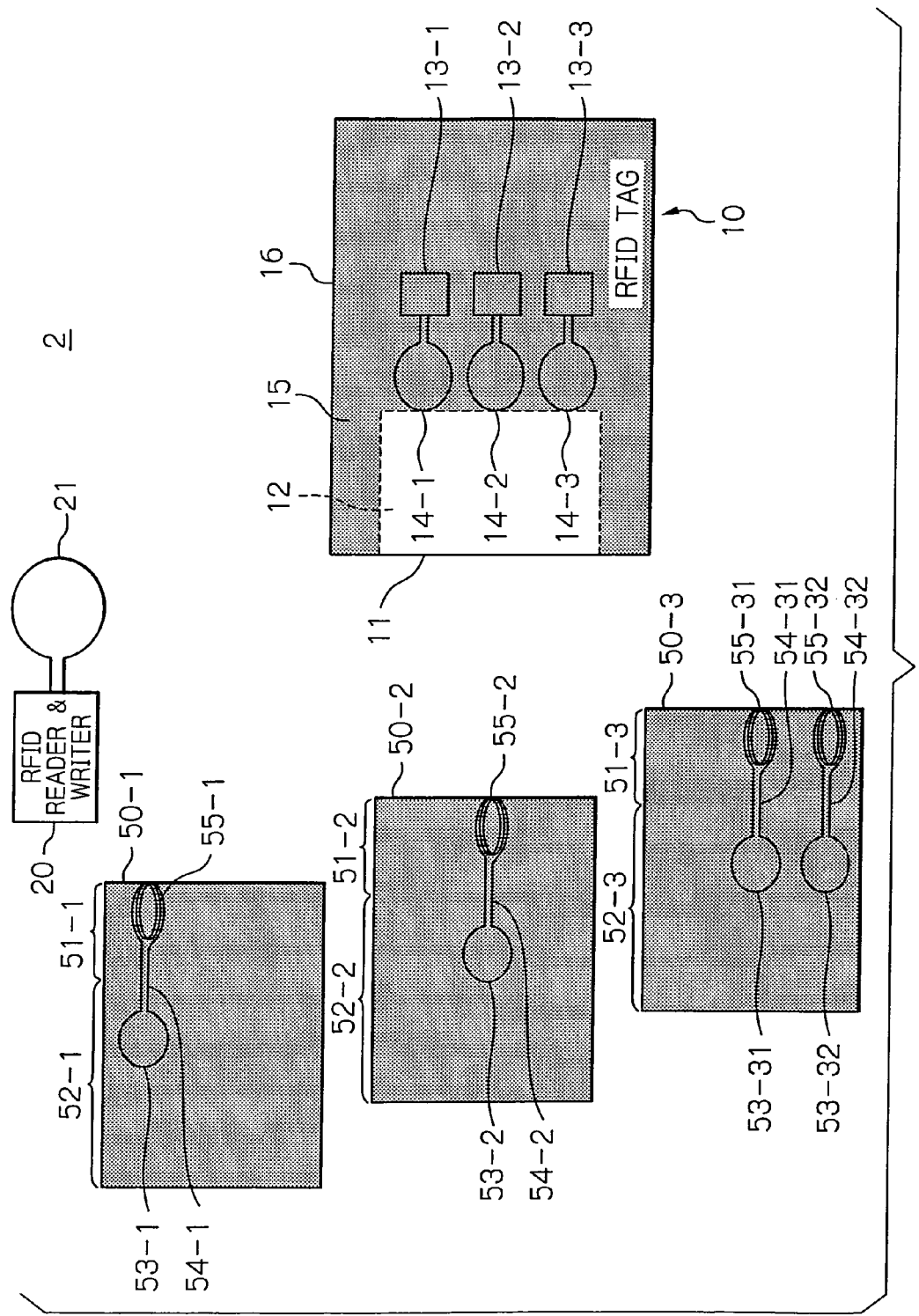
FIG. 5 illustrates, similarly to FIG. 1, the schematic configuration of the RFID tag communications system in accordance with an alternative embodiment of the invention.

With reference to further figures, a description will now be given of an RFID tag communications system in accordance with an alternative embodiment of the present invention. FIG. 5 illustrates the schematic configuration of the RFID tag communications system of an alternative embodiment. In FIG. 5, like elements or components are designated with the identical reference numerals.

In FIG. 5, an RFID tag communications system 2 of the alternative embodiment mainly includes the RFID tag 10, RFID reader and writer 20, and a plurality (three in the example of FIG. 5) of inductive antenna devices 50-1, 50-2 and 50-3.

The RFID tag 10 of the alternative embodiment includes a different number of RFID chips and tag antennas from the RFID tag of the illustrative embodiment shown in and described with reference to FIG. 1. Specifically, the RFID tag 10 of the alternative embodiment includes a plurality of RFID chips 13-1, 13-2 and 13-3, and a plurality of tag antennas 14-1, 14-2 and 14-3 respectively connected to the RFID chips 13-1, 13-2 and 13-3, the plurality being three in the example shown in FIG. 5.

The plurality of tag antennas 14-1, 14-2 and 14-3 are disposed in different positions such that each of the tag antennas may establish the electromagnetic coupling with corresponding one of the tag-side inductive antennas 55-1, 55-2 and 55-3, which are differently positioned as will be described below. It is to be noted that the RFID chips 13-1, 13-2 and 13-3 may-be in the vicinity of or spaced apart from the corresponding tag antennas 14-1, 14-2 and 14-3. Although FIG. 5 shows the plurality of tag antennas 14-1, 14-2 and 14-3 disposed in parallel in the vertical direction in the figure, the positions of the tag antennas are not limited to the specific arrangement. For example, different tag antennas may be provided on the upper, right and lower sides of the space 12 to be mated. The tag antennas 14-1, 14-2 and 14-3 may be electromagnetically shielded from each other.

In the alternative embodiment, it is intended that each of the RFID chips 13-1, 13-2 and 13-3 stores different tag information.

The RFID reader and writer 20 of the alternative embodiment may be the same as in the illustrative embodiment except that the RFID reader and writer 20 of the alternative embodiment functions as dealing with simultaneous access to, e.g. reading of, the plurality of RFID chips 13-1, 13-2 and 13-3. Namely, the RFID reader and writer 20 of the alternative embodiment may have an anti-collision function.

Each of the inductive antenna devices 50-1, 50-2 and 50-3 may be the same as the management inductive antenna device 40 of the illustrative embodiment shown in FIG. 1. The inductive antenna devices 50-1, 50-2 and 50-3 have mating card portions 51-1, 51-2 and 51-3 and non-mating card portions 52-1, 52-2 and 52-3, respectively. Each of the inductive antenna devices 50-1, 50-2 and 50-3 includes therein the reader and writer-side inductive antenna, conductive line, and tag-side inductive antenna, which may respectively be the same as the elements 43, 44 and 45 shown in FIG. 1. Note that for convenient description of the plurality of inductive antenna devices 50-1, 50-2 and 50-3, FIG. 5 shows the inductive antenna devices 50-1, 50-2 and 50-3 as being smaller than the space 12 to be engaged in the RFID tag 10. In the same manner as described for the management inductive antenna device 40 of the embodiment shown in FIG. 1, the inductive antenna devices 50-1, 50-2 and 50-3 are sized so that their mating card portions 51-1, 51-2 and 51-3 can engage with the space 12 to be mated in the RFID tag 10.

The inductive antenna devices 50-1, 50-2 and 50-3 are selectively arranged so as to access and mate with the respective RFID chips 13-1, 13-2 and 13-3 provided in the RFID tag 10. Specifically, differences are provided in position and number of a set of the reader and writer-side inductive antennas, conductive lines, and tag-side inductive antennas between the inductive antenna devices 50-1, 50-2, and 50-3.

The inductive antenna device 50-1 includes one set of reader and writer-side inductive antenna 53-1, conductive line 54-1, and tag-side inductive antenna 55-1. This set is positioned so that the inductive antenna device 50-1 may access the RFID chip 13-1 in the RFID tag 10, when engaged with the latter. The inductive antenna device 50-2 includes one set of reader and writer-side inductive antenna 53-2, conductive line 54-2, and tag-side inductive antenna 55-2. This set is positioned so that inductive antenna device 50-2 may access the RFID chip 13-2 in the RFID tag 10, when engaged with the latter. The inductive antenna device 50-3 includes two sets of reader and writer-side inductive antennas 53-31 and 53-32, conductive lines 54-31 and 54-32, and tag-side inductive antennas 55-31 and 55-32. The one set (53-31, 54-31 and 55-31) is positioned so that it may access the corresponding one RFID chip 13-1 in the RFID tag 10. The other set (53-32, 54-32, and 55-32) is positioned so that it may access the corresponding other RFID chip 13-3 in the RFID tag 10.

The reader and writer-side inductive antenna may be positioned differently from that shown in FIG. 5 while the tag-side inductive antenna may be positioned the same as in FIG. 5. This also allows an access to intended one of the RFID chips in the RFID tag 10. In the inductive antenna device 50-3, the two reader and writer-side inductive antennas 53-31 and 53-32 may be incorporated with each other.

Also in the alternative embodiment, the RFID reader and writer 20 cannot access the RFID tag 10 when having none of the label inductive antenna devices 50-1, 50-2, and 50-3 engaged because the electromagnetic shielding function prevents the enquiry electromagnetic wave from reaching the tag antenna. Specifically, the third party cannot make access to the RFID tag 10 unless mounting any of the label inductive antenna devices 50-1, 50-2, and 50-3, even using the RFID reader and writer 20.

When a normal or authorized user wishes to access the RFID chip 13-2 in the RFID tag 10, he or she inserts or engages the inductive antenna device 50-2 into the RFID tag 10 and activates the RFID reader and writer 20. In this case, the communication path is formed by two electromagnetic couplings between the antennas: the first electromagnetic coupling between the antenna 21 of the RFID reader and writer 20 and the reader and writer-side inductive antenna 53-2 of the inductive antenna device 50-2; and the second electromagnetic coupling between the tag-side inductive antenna 55-2 of the inductive antenna device 50-2 and the tag antenna 14-2. The RFID reader and writer 20 may thus access the RFID chip 13-2.

No electromagnetic coupling is established between the tag-side inductive antenna 55-2 of the inductive antenna device 50-2 and the tag antenna 14-1 or 14-3 because of the electromagnetic shielding function provided and the position of the tag antennas 14-1 and 14-3 in the RFID tag 10. With the inductive antenna device 50-2 being attached to the RFID tag 10, therefore, the RFID reader and writer 20 cannot access the RFID chip 13-1 or 13-3.

Likewise, when the normal or appropriate user attaches the inductive antenna device 50-1 to the RFID tag 10 and performs the access operation, he or she may access only the RFID chip 13-1. When the normal user attaches the inductive antenna device 50-3 to the RFID tag 10 and performs the access operation, he or she may access the RFID chips 13-1 and 13-3 at the same time.

The alternative embodiment may provide the same advantages as the illustrative embodiment shown in and described with reference to FIG. 1, and further provide the following advantages.

The provision of the plurality of RFID chips in the RFID tag allows tag information to be stored in appropriate RFID chips in dependent upon the kind or level of information. Even in the case of storing a series of tag information, a large amount of information may be stored in dependent upon the plurality of RFID chips.

A plurality of inductive antenna devices are provided correspondingly to combinations of the RFID chips so as to allow different combinations of the RFID chips accessible in one access operation to be prepared. For example, if a chief and his or her staff have inductive antenna devices different from each other, then different RFID chips are accessible in dependent upon the chief and staff. The alternative embodiment may thus control the access operation more finely.

Further with reference to the figures, a description will now be given of an RFID tag communications system of another alternative embodiment of the present invention. In the illustrative embodiments described above, the inductive antenna device is detachable from the RFID tag. In the other alternative embodiment, the inductive antenna device is mounted movable on the RFID tag.

Figure 6A:
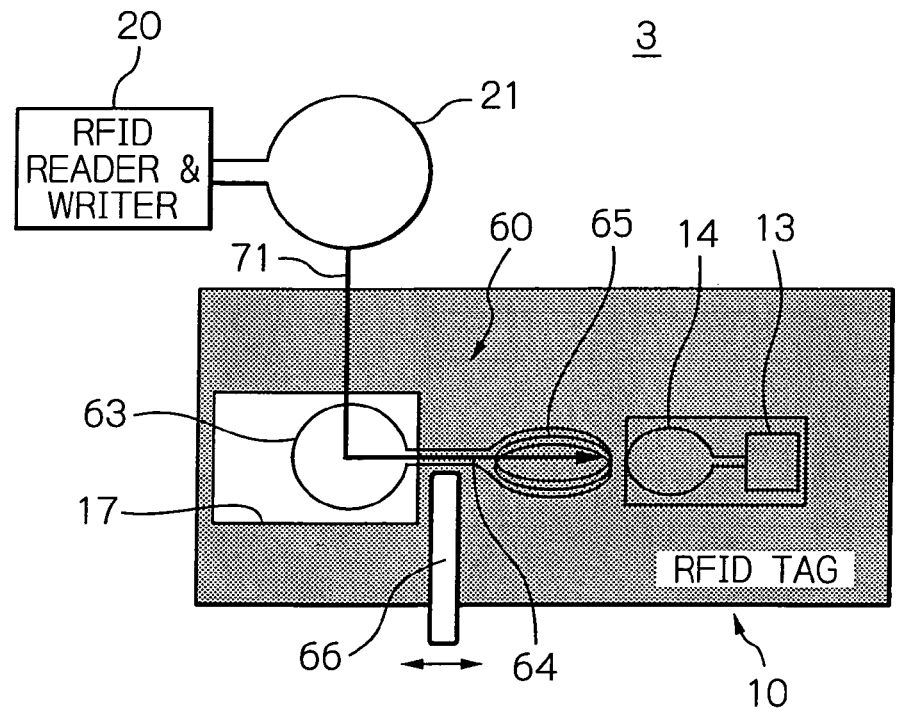
FIGS. 6A and 6B illustrate the schematic configuration of the RFID tag communications system in accordance with another alternative embodiment of the invention.
Figure 6B:
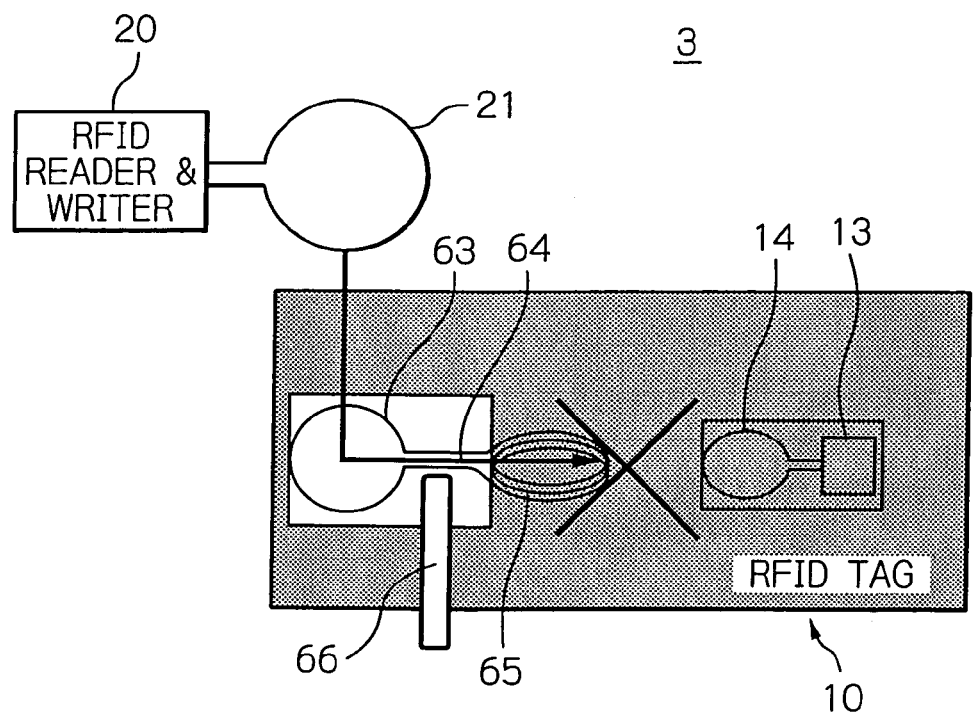

FIGS. 6A and 6B illustrate the schematic configuration of the RFID tag communications system of the instant alternative embodiment. Like elements are designated with the same reference numerals. In FIGS. 6A and 6B, an RFID tag communications system 3 of the alternative embodiment generally includes the RFID tag 10, RFID reader and writer 20, and an inductive antenna device 60.

The RFID tag 10 of the instant alternative embodiment is also, for example, generally of a card-like rectangular shape. Unlike the RFID tag in the embodiments described above, the RFID tag 10 of the present embodiment does not include an insertion slot and a space corresponding to the slot 11 and space 12 to be engaged, respectively, into which the inductive antenna device is inserted. The RFID tag 10 of the instant alternative embodiment has an opening 17 formed therein. Except for the area of the opening 17, the electromagnetic shielding function attained by the surface member 16 applied by processing an electromagnetic shielding material prevents communication from being established between the inside of the RFID tag 10 and an outside device. The opening 17 may be electromagnetic, and may be covered with a resin or the like, for example. It is needless to say that the RFID tag 10 of the instant alternative embodiment includes therein the RFID chip 13 and tag antenna 14.

The inductive antenna device 60 of the instant embodiment includes a reader and writer-side inductive antenna 63, a conductive line 64 and a tag-side inductive antenna 65, as well as a shifting device 66. The reader and writer-side inductive antenna 63, conductive line 64, and tag-side inductive antenna 65 are provided in the RFID tag 10 such that they may move between the opposite end positions in link with the shifting device 66 manipulated. The reader and writer-side inductive antenna 63, conductive line 64, and tag-side inductive antenna 65 may all be sealed in a resin body, which is adapted to be movable as a unit. Alternatively, the tag-side inductive antenna 65 may be designed movable alone. The movement may be reciprocal, rotational or pivotal.

The reader and writer-side inductive antenna 63, conductive line 64, and tag-side inductive antenna 65 may be designed so as not to stop at the opposite end positions of the movement and not a position on the way between the opposite end positions by means of, e.g. the elastic force of a spring or a stopper, not-shown.

At both the opposite end positions, the tag-side inductive antenna 65 resides in a space where the electromagnetic shielding function is effected. The opposite end positions are selected so that when the tag-side inductive antenna 65 is at the one end position, the electromagnetic coupling is possible between the tag-side inductive antenna 65 and tag antenna 14, and when the tag-side inductive antenna 65 is at the other end position, the electromagnetic coupling is impossible between the tag-side inductive antenna 65 and tag antenna 14.

The reader and writer-side inductive antenna 63 takes, when positioned in the opening 17, at least the one end position.

The shifting device 66 may be, for example, a simple knob or the like, or may include a plurality of members for converting a rotational motion to a linear motion. In this way, the user may handle the shifting device 66 to move the reader and writer-side inductive antenna 63, conductive line 64, and tag-side inductive antenna 65 between the opposite end positions.

With reference to FIG. 6B, the user may manipulate the shifting device 66 to bring the inductive antenna device 60 at the other end position when he or she does not wish unnecessary communication with the RFID tag 10. Under that situation, if the RFID reader and writer 20 performs the access operation, its antenna 21 and the reader and writer site antenna 63 of the inductive antenna device 60 may establish the electromagnetic coupling therebetween, but the inductive antenna device 60 staying at the other end position prevents the electromagnetic coupling between the tag-side antenna 65 and tag antenna 14, thereby preventing the communication between the RFID reader and writer 20 and RFID tag 10.

With reference to FIG. 6A, when the user wishes the communication with the RFID tag 10, he or she may handle the shifting device 66 to position the inductive antenna device 60 at the one end position. If the RFID reader and writer 20 performs the access operation here, then its antenna 21 and the reader and writer-side antenna 63 of the inductive antenna device 60 located in the opening 17 may establish the electromagnetic coupling therebetween, and also the inductive antenna device 60 at the one end position may establish the electromagnetic coupling between the tag-side-antenna 65 and tag antenna 14, thereby establishing the communication path 71 to allow communication between the RFID reader and writer 20 and RFID tag 10.

In this way, according to the instant alternative embodiment, when the inductive antenna device 60 is at the other end position, the RFID reader and writer 20 cannot access the RFID tag 10 due to the electromagnetic shielding function. The shifting device 66, using a key or the like, would increase the security of the tag-information of the RFID tag 10.

Further, according to the instant embodiment, the security function described above may eliminate the disabling of the RFID tag 10, e.g. when selling a produce carrying the RFID tag 10 for preventing the tag information from leaking or the like.

Still further, according to the instant embodiment, the transmitting and receiving functions per se of the RFID tag 10 and RFID reader and writer 20 may not specifically be tailored for security. The security function thus does not prolong the access time.

The coupling between the RFID tag 10 and inductive antenna device 60 is electromagnetic and not mechanical via a physical connector. There is thus no metallic components such as a mechanical connector which would be deteriorated by a water droplet, moisture or any other environmental factor.

According to the instant alternative embodiment, the inductive antenna device 60 may not be detached from the RFID tag 10, thereby avoiding the situation where the RFID tag 10 cannot be accessed when the loss of the inductive antenna device would have been lost.

Further, according to the instant embodiment, the user may easily determine whether or not the RFID chip is accessible by e.g. observing the position of, or touching, the shifting device 66.

Although the various embodiments have described above, there may be additional modifications, as will be described below. Although the embodiments described above use the card-like RFID tags, the invention is not limited to the card-like RFID tag but may be directed to an enclosure-like or a tubular shape. The inductive antenna device may be any shape corresponding to such an RFID tag shape.

The fitting method of the RFID tag with the inductive antenna device is not limited to what is described with reference to the illustrative embodiments. For example, the RFID tag may be adapted to include a slide cover so that the RFID tag, when its slide cover is shifted, may engage with the corresponding portion of the inductive antenna device.

Although the illustrative embodiments described above use the RFID tag having the single space 12 to be engaged, the RFID tag may include a plurality of spaces to be engaged. As a variant of the alternative embodiment shown in FIG. 5, for example, the spaces to be engaged may be provided correspondingly to the accessible RFID chips.

Although the alternative embodiment described with reference to FIGS. 6A and 6B uses the RFID tag having the solo RFID chip built therein, the technical idea of that embodiment may also be applied to the RFID tag having a plurality of RFID chips built in. In this case, an inductive antenna may be provided that is common to the plurality of RFID chips, or individual inductive antenna devices may be provided that mate with respective RFID chips. In the latter case, individual shifting devices may also be provided that mate with respective RFID chips, or a single shifting device may be provided that establishes the relationship between the RFID chips and inductive antenna devices which is described in respect of the embodiment shown in FIG. 5.

Although the alternative embodiment described with reference to FIGS. 6A and 6B employs the movable inductive antenna device, the inductive antenna device may not be movable but the RFID chip and tag antenna may be movable. Further, the inductive antenna device, RFID chip, or tag antenna may not be movable, but the electromagnetic shielding element may be movable, thereby establishing or interrupting the electromagnetic coupling between the tag-side inductive antenna and tag antenna.

Although the embodiments described above employ the RFID chip having a memory device that is readable and writable, a memory device in the RFID chip may be of the read-only type. Likewise, the RFID reader and writer may be replaced with an RFID reader or an RFID writer. They may be referred in generic to as an RFID access device.

In the illustrative embodiments, the state in which the label inductive antenna device 30 and RFID tag 10 are controlled in position where they may be electromagnetically coupled is sometimes referred to one positional relationship. The state in which the label inductive antenna device 30 and RFID tag 10 cannot be electromagnetically coupled is sometimes referred to as the other positional relationship. In the other positional relationship, the label inductive antenna device 30 and RFID tag 10 may be controlled to a specific position so far as they cannot be electromagnetically coupled.

The entire disclosure of Japanese patent application No. 2005-285160 filed on Sep. 29, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An RFID (Radio Frequency IDentification) tag comprising:
   an RFID chip;
   a tag antenna connected to said RFID chip;
   an electromagnetic shield for forming a space including said RFID chip and said tag antenna into an electromagnetically shielded space; and
   a positional-relationship controller for providing a first positional relationship and a second positional relationship as a relative positional relationship between an inductive antenna device and said RFID tag, said inductive antenna device including an access-device-side antenna capable of being electromagnetically coupled with an antenna of an RFID access device, a tag-side antenna capable of being electromagnetically coupled with said tag antenna and a conductive line for electrically connecting said access-device-side antenna with said tag-side antenna, said first positional relationship making possible electromagnetic coupling between said tag antenna and said tag-side antenna staying in said electromagnetically shielded space with said access-device-side antenna positioning outside said electromagnetically shielded space, said second positional relationship making impossible electromagnetic coupling between said tag antenna and said tag-side antenna.

2. The RFID tag in accordance with claim 1, wherein said first positional relationship controlled by said positional-relationship controller is a positional relationship in which said inductive antenna device is attached to said RFID tag, and said second positional relationship is a positional relationship in which said inductive antenna device is spaced apart from said RFID tag.

3. The RFID tag in accordance with claim 1, wherein said inductive antenna device is attached to said RFID tag movably relative to each other between said first positional relationship and said second positional relationship.

4. The RFID tag in accordance with claim 1, further comprising an additional RFID chip and an additional tag antenna which are a same as said RFID chip and said tag antenna, respectively, to form a set, said positional-relationship controller being operative to said inductive antenna device.

5. An RFID (Radio Frequency IDentification) tag communications system comprising:

an RFID tag including an RFID chip and a tag antenna connected to said RFID chip;

an RFID access device for activating wireless communication for accessing said RFID tag; and an inductive antenna device including an access-device-side antenna capable of being electromagnetically coupled with an antenna of said RFID access device, a tag-side antenna capable of being electromagnetically coupled with said tag antenna, and a conductive line for electrically connecting said access-device-side antenna and said tag-side antenna, said RFID tag comprising:

an electromagnetic shield for forming a space including said RFID chip and said tag antenna into an electromagnetically shielded space; and a positional-relationship controller for providing a first positional relationship and a second positional relationship as a relative positional relationship between said inductive antenna device and said RFID tag, said first positional relationship making possible electromagnetic coupling between said tag antenna and said tag-side antenna staying in said electromagnetically shielded space with said access-device-side antenna positioning outside said electromagnetically shielded space, said second positional relationship making impossible electromagnetic coupling between said tag antenna and said tag-side antenna.

6. The system in accordance with claim 5, wherein said first positional relationship controlled by said positional-relationship controller is a positional relationship in which said inductive antenna device is attached to said RFID tag, and said second positional relationship is a positional relationship in which said inductive antenna device is spaced apart from said RFID tag.

7. The system in accordance with claim 5, wherein said inductive antenna device is attached to said RFID tag movably relative to each other between said first positional relationship and said second positional relationship.

8. The system in accordance with claim 5, wherein said RFID tag further comprises an additional RFID chip and an additional tag antenna which are a same as said RFID chip and said tag antenna, respectively, to form a set, said positional-relationship controller being operative to said inductive antenna device.

9. An inductive antenna device intervening in communication between an RFID (Radio Frequency IDentification) tag including an RFID-chip and a tag antenna connected to the RFID chip and an RFID access device for activating wireless communication for accessing the RFID tag, comprising:

an access-device-side antenna capable of being electromagnetically coupled with an antenna of the RFID access device;

a tag-side antenna capable of being electromagnetically coupled with the tag antenna; and a conductive line for electrically connecting said access-device-side antenna and said tag-side antenna, a first positional relationship and a second positional relationship being provided as a relative positional relationship of said inductive antenna device to said RFID tag, said first positional relationship making possible electromagnetic coupling between the tag antenna and said tag-side antenna staying in an electromagnetically shielded space provided in the RFID tag with said access-device-side antenna positioning outside the electromagnetically shielded space, said second positional relationship making impossible electromagnetic coupling between the tag antenna and said tag-side antenna.

* * * * *